United States Patent Office 3,533,278
Patented Oct. 13, 1970

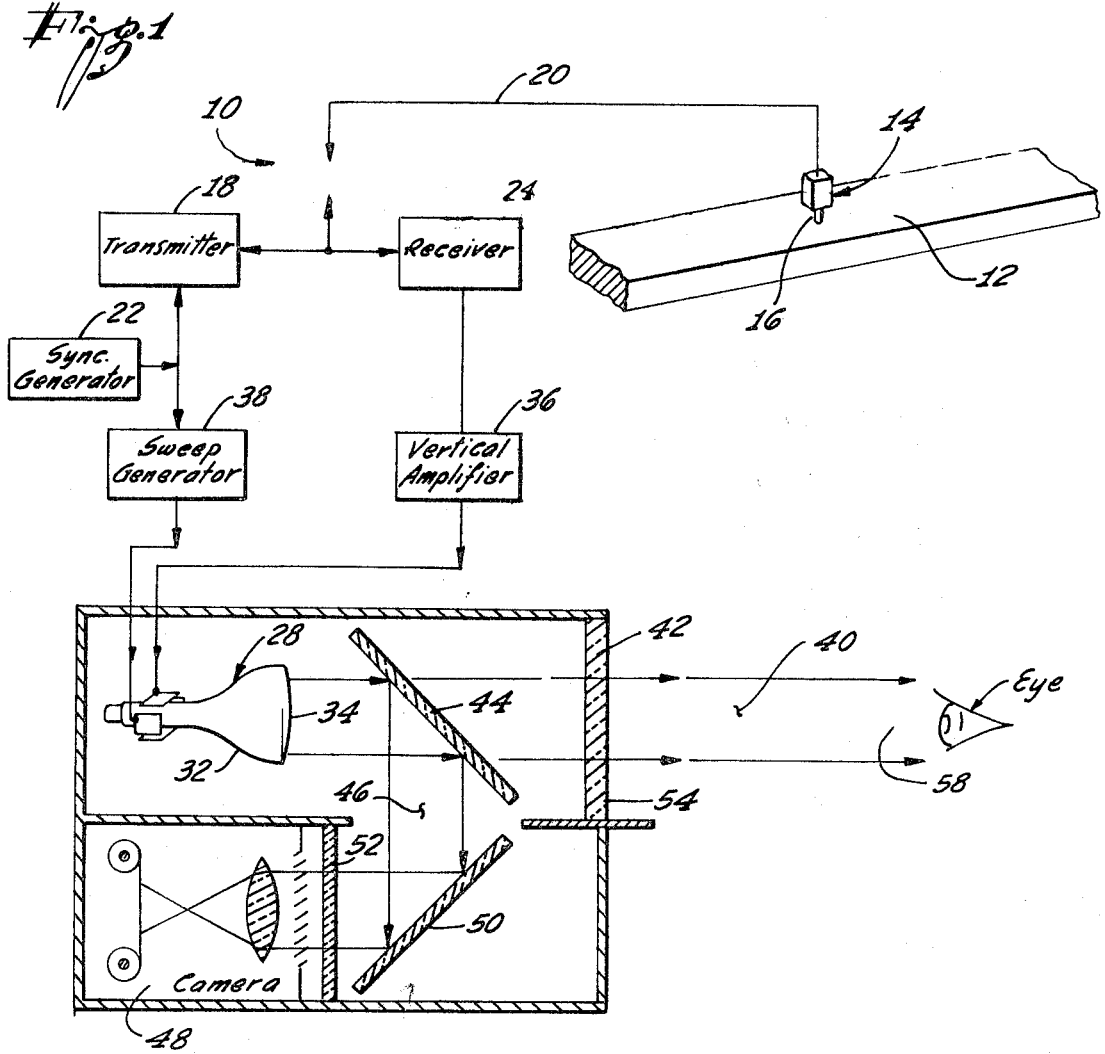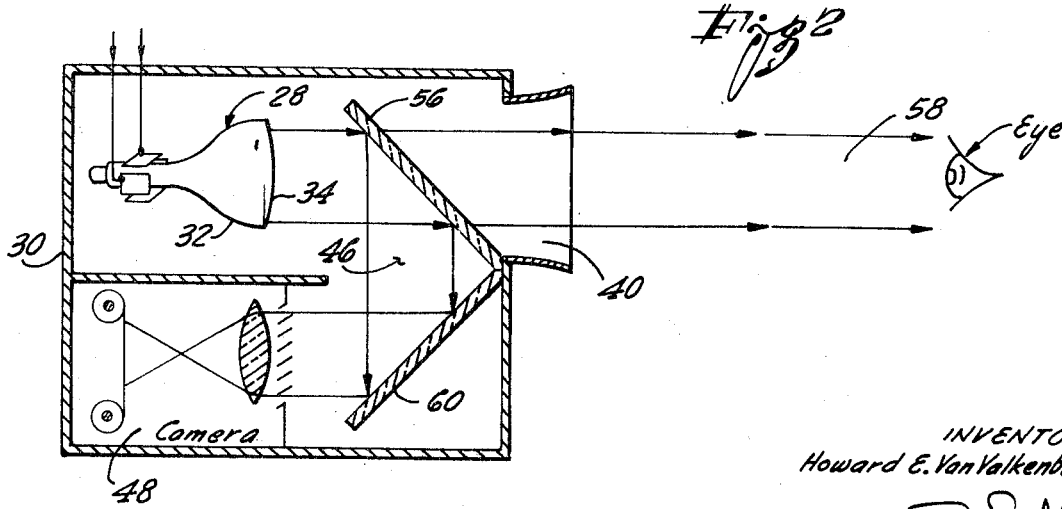

3,533,278
ULTRASONIC NONDESTRUCTIVE MATERIAL
TESTER INCLUDING COMBINATION VIEW-
ING AND RECORDING MECHANISM
Howard E. Van Valkenburg, New Fairfield, Conn., assignor to Automation Industries, Inc., El Segundo, Calif., a corporation of California
Filed Nov. 24, 1967, Ser. No. 685,569
Int. Cl. G01n 29/04; H01j 29/89
U.S. Cl. 73—67.8
18 Claims

ABSTRACT OF THE DISCLOSURE

An ultrasonic material testing instrumentation reflex record and view system is described in which a cathode ray oscilloscope is provided with a mixture of blue and yellow phosphors; the blue being low persistence and the yellow being high persistence. The oscillograph is housed in a case which is substantially closed except for a viewing aperture for external monitoring of the oscilloscope. A yellow filter is placed over the aperture and permits of viewing of only the long persistance phoshor output and keeps all but yellow light from entering the housing case. A recording camera is also housed in the case and is coupled to the oscilloscope screen by a pair of dichloric mirrors and through a blue filter. The filter and mirrors are arranged whereby only blue phosphor output impinges upon the camera, only yellow phosphor output is viewed externally, and all ambient light is blocked from the camera.

BACKGROUND OF THE INVENTION

(1) Field of the invention

This invention relates generally to instrumentation for testing systems and more particularly to novel oscillograph viewing and recorder apparatus.

Although the invention exhibits particularly useful application in the field of ultrasonic testing instrumentation and although in the cause of brevity and clarity of presentation, much of the following discussion and description of examples relate particularly thereto, it is expressly to be understood that the advantages of the invention are equally well manifest in other utilizations wherein it is desired to provide a plurality of separated optical outputs from the presentation of a single oscilloscope, or the like, instrument.

(2) Discussion of the prior art

In the nondestructive ultrasonic testing of materials and structures, it is often quite advantageous to provide a continuous real time presentation of the results while, at the same time, providing a permanent record for documenting the test for further analysis, comparison or the like. Conventional cathode ray oscilloscopes optimized for either purpose have heretofore been known and available. Normally a long persistence screen oscilloscope is preferred for direct viewing whereby the human eye can integrate several successive traces. Conversely an oscilloscope with a very short or no persistence screen is preferred for photographic recording as this permits recording an individual trace. For a single screen to serve both direct viewing and photographing one or both objectives suffer. Also, if a single oscilloscope screen is available simultaneously for direct viewing and photographing a considerable amount of stray ambient light normally enters the camera and degrades the images.

One approach has been to provide separate oscilloscopes. One has a long persistence for direct viewing while the other has a very short or no persistence for photographing. Such an arrangement is expensive and complex and frequently leads to errors in correlation between the two oscilloscopes. In addition, the absence of reflex viewing between the two observation paths allows for a breakdown of one oscilloscope or a loss of cross correlation between the two displays without the fault becoming immediately apparent.

Accordingly, it is an object of the present invention to provide reflex instrument record apparatus which is not subject to these and other disadvantages and limitations of the prior art.

It is another object to provide such apparatus which utilizes a single oscilloscope screen.

It is another object to provide such apparatus which provides a high persistency presentation along one optic path and low persistency presentation along the other.

It is another object to provide such apparatus which supplies substantially full brightness along each path.

It is another object to provide such apparatus in which while one optic path extends into an external environment of high ambient light levels, substantially no ambient light reaches the utilization devices at the end of the other path.

It is another object to provide such apparatus which is reliable, compact, low in mass, bulk, complexity and cost.

SUMMARY OF INVENTION

Very briefly these and other objects are achieved in accordance with structural aspects of one example of the invention which comprises an oscilloscope having at least two different groups of phosphorus in its presentation screen. In this example, one group has a relatively long persistency suitable for direct viewing. The other group has a relatively short persistence or no persistence suitable for photographing. The phosphors in the two groups produce two separate and distinct colors. The oscilloscope is disposed in a light tight housing defining at least two separate optic paths from the screen of the oscilloscope. The paths are separated by dichroic means whereby each path is transparent only to its respective color and opaque to the other color. As a result the oscilloscope can be directly viewed along one path while the oscilloscope may be photographed along the other path. Stray ambient light entering along the direct viewing path is of such a wavelength the path for photograping is opaque to this light.

Further details of these and other novel features, as well as the method aspects of the invention and other examples thereof and its principles of operation, will be best understood from a consideration of the following description when taken in connection with the accompanying drawing, the figures of which are presented by way of example only.

BRIEF DESCRIPTION OF THE DRAWINGS

FIG. 1 is a combination block diagram and cross sectional view of a material tester embodying one form of the present invention, and FIG. 2 is a cross sectional view of an oscilloscope embodying another form of the present invention.

DESCRIPTION OF A PREFERRED EMBODIMENT

With reference to the figures in detail, it is stressed that the particulars shown are for purposes of illustrative discussion only and are presented in the cause of providing what is believed to be the most useful and readily understood description of the principles and conceptual aspects of the invention. Further in this regard, no attempt is made to show or discuss structural or method features or ramifications in more detail than is necessary for a fundamental understanding of the invention. The description taken with the figures will make it apparent to those skilled in the material testing and instrumentation arts how the several forms of the invention may be embodied in practice.

Specifically, the detailed showing is not to be taken as any limitation upon the scope of the invention as many modifications and alternatives may be made and still remain within the spirit and scope of this invention.

In FIG. 1 the present invention is shown in a material tester 10 for inspecting an elongated workpiece 12 and recording the results of the inspection. The tester includes a search unit 14 having at least one transducer 16 therein. The transducer 16 is effective to transmit in response to an electrical signal and/or receive ultrasonic energy and produce a corresponding electrical signal.

A transmitter 18 is coupled to the transducer by a transmission line such as a coaxial cable 20. A synchronous generator 22 is coupled to the transmitter 18. The synchronous generator 22 periodically produces trigger pulses which energize the transmitter 18. The transmitter 18 then produces an electrical pulse which causes the transducer 16 to transmit pulses of ultrasonic energy into the workpiece 12.

Acoustical coupling means, such as water, etc. may be provided between the search unit 14 and the workpiece 12. Whenever the ultrasonic energy passes through an interface or other form of acoustical discontinuity at least a portion of the energy is reflected back to the transducer 16. For example, an echo will be returned from the front face of the workpiece 12. Also an echo will normally be returned from the back side. If there are any discontinuities, such as cracks, inclusions, etc. inside of the workpiece 12, echoes will normally be returned to the transducer 16. The time delay for receiving the echo is a function of the range to the reflecting surface.

A receiver 24 is coupled to the transducer by the coaxial cable 20 to receive the signals generated by the transducer 16 as a result of the incident echoes. The received signal normally includes a series of pulses. The first and largest signal normally corresponds to the "main bang," i.e. the transmission of the ultrasonic pulse. This is then followed by a series of pulses of lesser amplitudes corresponding to the reflecting surfaces etc.

The entire workpiece 12 or portions of particular interest, may be inspected by moving the search unit 14 over the entrant surface of the workpiece 12. In order to utilize the signals from the receiver 24, suitable indicating means may be employed. In the present instance this includes a cathode ray oscilloscope 28 which is contained within an essentially light tight box 30.

The oscilloscope 28 may be of a conventional variety having an evacuated envelope 32 with a transparent face 34. An electron gun is disposed inside the envelope 32 to bombard the face 34 with electrons. Vertical and horizontal deflection means, such as electrostatic deflection plates, may be provided for controlling the direction of the beam.

The inside of the face 34 is coated with phosphors that are excited by the high energy electrons in the beam. When so excited the phosphors luminesce and produce visible light. The phosphors in the coating are preferably a mixture of phosphors from two different groups. The first group may produce light predominantly within a particular range of wavelengths, for example in the yellow portion of the spectrum. These phosphors also have a distinctive persistence for example they may be of relatively long persistence suitable for direct visual viewing.

The phosphors in the second group emit light of an entirely different color. For example, this light may be predominantly within the blue region of the spectrum. These phosphors may have a relatively short persistence or virtually no persistence at all suitable for photographing.

The signal output of the receiver 24 is coupled to a vertical amplifier 36 which is, in turn, coupled to the vertical deflection means in the oscilloscope 28. The output of the synchronous generator 22 is coupled to a sweep generator 38 which is coupled to the horizontal deflection means. Each time a pulse of ultrasonic energy is transmitted, the electron beam is swept horizontally across the face 34 by the sweep generator 38. During this sweep the signal from the receiver 24 will cause the beam to be deflected vertically each time an echo pulse is received. Thus, it may be seen that a conventional A-type repetitive trace presentation may be provided on the face 34 of the oscilloscope 28. The resultant luminescent oscillogram or trace includes a series of vertical "pips" that correspond to the various echoes received by the transducer 16 with the horizontal spacings between these "pips" corresponding to the distances to reflecting surfaces. The luminescent oscillogram will include a blue portion generated by the short persistent phosphors and a yellow portion generated by the long persistence phosphors.

A first optical path 40 may be provided whereby the operator may visually and directly observe the display generated on the face 34 of the oscilloscope 28. This path 40 includes a filter 42 which will pass the light in the first group of phosphors, i.e. yellow. This path 40 is opaque to the other color, i.e. blue. As a result, the operator will only be able to view the longer persistence yellow portion of the display.

A dichroic mirror 44 or similar device may be disposed between the filter 42 and the face 34 of the oscilloscope 28. This mirror 44 is constructed and oriented to pass the same color light as the filter, i.e yellow. However, it is also arranged to reflect light of the other color along a second optical path 46.

In order to obtain a picture record of the display a camera 48 may be disposed on the second optical path 46. The second path 46 also includes a second dichroic mirror element, such as a mirror 50 and a second filter 52. This filter 52 is preferably highly transparent to the light of the second color (i.e. blue) and substantially opaque to the first color (i.e. yellow).

The blue light produced by the short persistent phosphors will therefore reach the camera 48. If any ambient light from outside the box 30 enters through the viewing port 54 only the yellow portion of this light will pass through the yellow filter 42. However, since the blue filter 52 is opaque to yellow light, none of the ambient light nor the yellow light from the long persistent phopshors will reach the camera 48. Accordingly, ambient light will not, in any way, adversely effect the photograph obtained by the camera even though the display is being directly viewed during the exposure.

It will thus be seen that the first group of phosphors may have a persistence which is sufficiently long to insure optimum optical viewing of the oscillogram. Conversely, the phosphors in the second group may have the optimum persistence for obtaining photographs. Normally for photographing it is preferable for the persistence to be extremely short. This permits the camera to obtain a photograph of a single trace or if the exposure is sufficiently long, it can record the individual trace on a limited number of successive scans.

Referring to FIG. 2, an alternative optical arrangement of the invention is illustrated in which the mirror elements are constructed integrally with the color filters. The first optical path 40 is now through a mirror-filter element 56 which passes the yellow wavelength group through the viewing port 54 to the viewing location at 58. The blue light is prevented from passing through the port 54 by this filter 56. However, the element 56 reflects the blue light along the second optical path 46 and onto a second blue reflector-filter element 60. This effectively absorbs any remaining yellow light and reflects the blue light into the camera 48.

In operation, the function and principles of the apparatus of FIG. 2 are similar to the embodiment of FIG. 1. The yellow emission from the long persistence phosphors of the face 34 traverse the first optical path 40 with substantially full brightness. The operator can thereby directly view the face 34. The blue emission from the short persistence phosphors are reflected along the second optical path 46 to the camera 48. Ambient or spurious light from the environment of the viewing location at 58 is blocked at all times from entry into the camera 48.

There have thus been disclosed and described examples of a reflex instrument recording apparatus and method which exhibit the advantages and achieve the objects set forth hereinabove.

What is claimed is:

1. A device of the class described, including
    a housing having a viewing port;
    oscilloscope means housed therewithin and viewable from an external ambient environment along a first optical path through said port;
    said oscilloscope having a presentation screen including a first group of phosphors effective to emit light in a first range of wavelengths whereby the light emitted by phosphors in said first group being predominantly blue, and a second group of phosphors effective to emit light in a second range of wavelengths whereby the light emitted by the phosphors in said second group being predominantly yellow;
    optical recorder means sensitive to the blue light in said first wavelength group for making a record;
    first optical filter means interposed in said first optic path for transmitting light in substantially only said second range of wavelengths;
    a second optic path in said housing between said oscilloscope and said optical recorder means; and
    second optical filter means interposed in said second optic path for transmitting light of substantially only said first wavelength group.

2. The combination of claim 1 wherein
    a third optical path extends between said viewing point and said optic recorder means, said first and second optic filter means being effective to make said third path being substantianlly opaque to ambient light.

3. The combination of claim 1 wherein the phosphors in said first group have a relatively short persistence and the phosphors in said second group have a relatively long persistence.

4. The combination of claim 1 wherein
    one of said filter means is transparent to blue and opaque to yellow and the other of said filter means is transparent to yellow and opaque to blue.

5. The combination of claim 1 wherein
    said first and second optic filter means comprise yellow and blue dichroic, reflective filters respectively.

6. The combination of claim 1 including
    ultrasonic apparatus for nondestructive examination of visually opaque materials and which is further characterized by including acoustic energy transducer means positionable in probative acoustic energy interchange relation with the material to be examined and having receiver and signal conditioning means coupled to said transducer and oscilloscope means for analyzing and presenting to said oscilloscope means signals representative of the internal nature and defects of said materials.

7. The combination of claim 1 including
    at least one dichroic mirror means interposed in a bifurcating relation in said first and second paths and optically between said oscilloscope means and said second optic filter means,
    said first optical path is substantially a straight line and said second optical path contains at least one reflection at said dichroic mirror means, said dichroic mirror means being of the character and being disposed to cause the reflection of light of said first optic wavelength group, presenting light traversing said second path for utilization at a second location and precluding the traversal of said ambient light and spurious light between said first and second location.

8. Method of providing separated optical presentations from a cathode ray oscilloscope having an electron beam responsive screen including at least two groups of phosphors, one emitting yellow light and the other emitting blue light, the method comprising the steps of
    dichroically bifurcating the combined light output of the screen such that yellow light traverses a first optic path and blue light traverses a second optic path,
    filtering light in said first path to pass yellow light therealong and reject blue light,
    filtering light in said second path to pass blue light therealong to a first utilization location, second wavelength group and reject yellow light, and
    blocking, by said filtering and bifurcating, said ambient light from traversing between said first and second locations.

9. A device of the class described including the combination of
    a housing having a viewing port,
    an oscilloscope having a viewing face for producing a luminous display disposed inside said housing,
    a camera having a lens disposed in said housing for photographing said display,
    a first optical path extending from said face to said viewing port,
    a second optical path extending from said face to said camera,
    means in said first path making said path transparent to a first color and opaque to a second color,
    means in said second path making said path transparent to said second color and opaque to said first color,
    a first group of phosphors on said face for producing said first color whereby a portion of said display is of said first color, said first group of phosphors having a long persistence for direct visual viewing, and
    a second group of phosphors on said face for producing said second color whereby a portion of said display is of said second color, said second group of phosphors having a short persistence for photographing.

10. A device of the class described including:
    a housing having a viewing port;
    oscilloscope means disposed within said housing and viewable from an external ambient environment along a first optical path through said port, said oscilloscope having a presentation screen including a first group of phosphors being disposed thereon and being effective to emit light in a first range of wavelengths and a second group of phosphors being disposed thereon and being effective to emit light in a second range of wavelengths;
    optical recorder means sensitive to light in the first wavelength group for making a record;
    first optical filter means being positioned in the first optic path for transmitting light in substantially only the second range of wavelengths;
    a second optic path in said housing between said oscilloscope and said optical recorder means; and
    second optical filter means being disposed within the second optic path for transmitting light of substantially only the first wavelength group.

11. The combination as defined in claim 10 and further including a third optical path extending between the viewing point and said optic recorder means, said first and second optic filter means being effective to make the third path substantially opaque to ambient light.

12. The combination as defined in claim 10 and wherein the phosphors in the first group have a first persistence and the phosphors in the second group have a second persistence.

13. The combination as defined in claim 10 and wherein the light emitted by the phosphors in the first group is predominantly yellow.

14. The combination as defined in claim 10 and further including ultrasonic apparatus for nondestructive examination of visually opaque materials, said apparatus including acoustic energy transducer means positionable in probative acoustic energy interchange relation with the material to be examined and having receiver and signal conditioning means coupled to said transducer and oscilloscope means for analyzing and presenting to said oscilloscope means signals representative of internal nature and defects of said materials.

15. The combination as defined in claim 10 and further including:
   at least one dichroic mirror means interposed in a bifurcating relation in said first and second paths and optically between said oscilloscope means and said second optic filter means; and
   the first optical path being substantially a straight line and the second optical path contains at least one reflection at said dichroic mirror means, said dichroic mirror means being of the character and being disposed to cause the reflection of light of the first optic wavelength group, presenting light traversing the second path for utilization at a second location and precluding the traversal of the ambient light and spurious light between the first and second location.

16. A method of providing separated optical presentations from a cathode ray oscilloscope having an electron beam responsive screen including at least two groups of phosphors one emitting light of a first wavelength group and the other emitting light of a second wavelength group, the method comprising the steps of:
   dichroically bifurcating the combined light output of the screen such that light of the first wavelength group traverses a first optic path and light of the second wavelength group traverses a second optic path;
   filtering light in the first path to pass light therealong of the first wavelength group and reject light of the second wavelength group;
   filtering light in the second path to pass light of the second wavelength group therealong to a first utilization location, and reject light of the first wavelength group; and
   blocking, by the filtering and bifurcating, the ambient light from traversing between the first and second locations.

17. A device of the class described including the combination of:
   a housing having a view port;
   an oscilloscope having a viewing face for producing a luminous display being disposed inside said housing;
   a camera having a lens disposed in said housing for photographing the display on the face of said oscilloscope;
   a first optical path extending from the face of said oscilloscope to the viewing port of said housing;
   a second optical path extending from the face of said oscilloscope to the lens of said camera;
   means being disposed in the first optical path for causing the first optical path to become transparent to a first color and opaque to a second color;
   means being disposed in the second path for causing the first optical path to become transparent to the second color and opaque to the first color;
   a first group of phosphors being disposed on the face of said oscilloscope for producing the first color whereby a portion of said display is of the first color; and
   a second group of phosphors being disposed on the face of said oscilloscope for producing the second color whereby a portion of said display is of the second color.

18. The combination as defined in claim 17 and wherein:
   the phosphors in the first group having a long persistence for direct visual viewing; and
   the phosphors in the second group having a short persistence for photographing.

References Cited

UNITED STATES PATENTS

| | | | |
|---|---|---|---|
| 2,537,040 | 1/1951 | Doyle et al. | 346—33 |
| 2,280,226 | 4/1942 | Firestone | 73—67.8 |
| 2,508,562 | 5/1950 | Bonner | 178—7.88 XR |
| 2,751,275 | 6/1956 | Mansberg | 346—110 |
| 2,817,265 | 12/1957 | Covely | 178—7.88 XR |
| 3,142,528 | 7/1964 | Stafford et al. | 346—10 |
| 3,369,179 | 2/1968 | Tanaka | 346—110 |

RICHARD C. QUEISSER, Primary Examiner

J. P. BEAUCHAMP, Assistant Examiner

U.S. Cl. X.R.

178—7.86; 7.88; 346—110